June 12, 1923.
E. J. LAHAN
MUD LUG
Filed Oct. 14, 1920
1,458,305
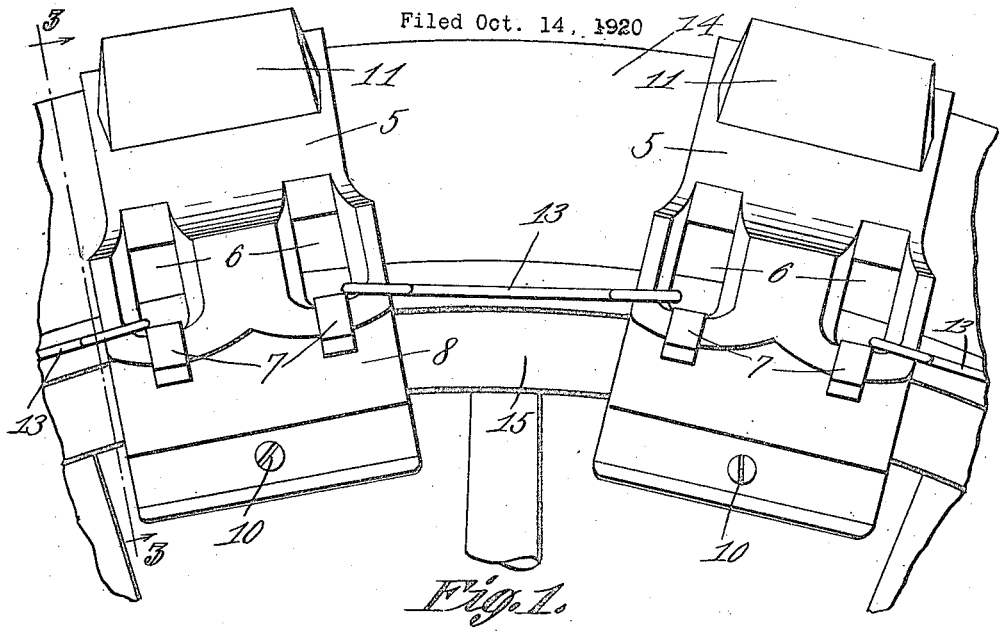
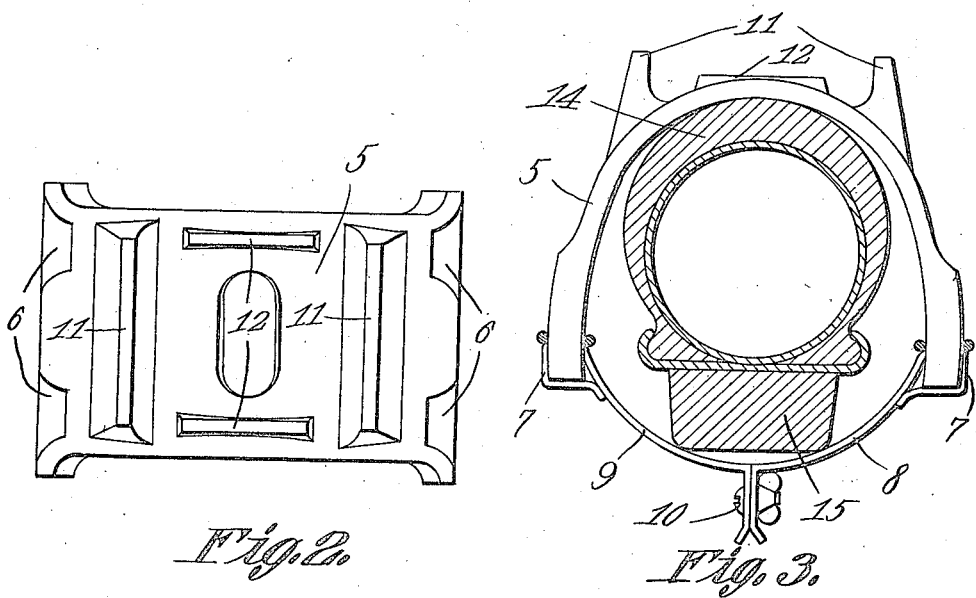
Inventor,
E. J. Lahan.
By C. A. Snow & Co.
Attorneys Patented June 12, 1923.

1,458,305

UNITED STATES PATENT OFFICE.

EDWARD J. LAHAN, OF QUINCY, ILLINOIS.

MUD LUG.

Application filed October 14, 1920. Serial No. 416,821.

*To all whom it may concern:*

Be it known that I, EDWARD J. LAHAN, a citizen of the United States, residing at Quincy, in the county of Adams and State of Illinois, have invented a new and useful Mud Lug, of which the following is a specification.

This invention relates to mud lugs to be employed in connection with motor vehicle tires to increase traction and prevent lateral slipping of a wheel equipped with the device.

A further object of the invention is to provide novel means for securing the mud lug to a wheel to prevent movement thereof, with relation to the wheel.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a fragmental side elevational view of a wheel equipped with mud lugs constructed in accordance with the present invention.

Figure 2 illustrates a plan view of the tread surface of a mud lug.

Figure 3 illustrates a sectional view taken on line 3—3 of Figure 1.

Referring to the drawing in detail, the anti-skid device includes a plurality of mud lugs, each of which includes a main or body portion indicated generally by the reference character 5, which has spaced openings 6 formed adjacent to the ends thereof, which openings are designed to accommodate the fingers 7 carried by the securing element, the fingers 7 being however formed integral with the securing element, and bent around one wall of the respective opening.

Each lug also includes downwardly extending arms 5', the body portion of the lugs being curved so that the arms will lie in spaced relation with the outer side walls of the tire to which the device is applied. The arms 5' extend inwardly and terminate at points adjacent to the outer periphery of the felloe 15. Thus it will be seen that the lug only contacts with the tire at the tread portion thereof, eliminating all wear on the side walls of the tire.

The securing element includes opposed metallic sections 8 and 9, which have right angled portions adapted to cooperate to form securing flanges, the flanges being however apertured intermediate their ends to receive the bolt 10 whereby the flanges may be secured together to prevent displacement of the mud lug.

Formed on the body portion 5 are the lugs 11 which extend transversely of the body portion, and in parallel relation with each other. Extending longitudinally of the body portion are the relatively small lugs 12, which are also disposed in spaced relation with each other and have their ends terminating in spaced relation with the lugs 11, the lugs 11 being for the purpose of restricting lateral movement of the wheel supplied with the device, while the lugs 12 are designed to increase the traction of the wheel.

In the use of the device the body portion 5, which is shown more clearly by Figure 3 of the drawing, is positioned over the tire 14, the body portion having its arms disposed adjacent to the felloe of the wheel, the felloe being indicated at 15 and embraced by the securing elements 8 and 9, so that lateral movement of the mud lug with respect to the tire, and wheel on which the same is supported, is eliminated.

It might be found desirable to employ one of the devices independently of another, and to this end the links indicated at 13 which connect adjacent mud lugs, may be eliminated.

Having thus described the invention, what is claimed as new is:—

An anti-skid device including mud lugs, each of which comprises a curved body portion formed of rigid material and having pairs of openings formed adjacent to the ends thereof, opposed metallic securing sections, each of said sections having a pair of fingers, said fingers adapted to extend through the openings of the body portion and engage the body portion to fasten the securing sections to the body portion, means for clamping the securing sections together, spacing links having their ends disposed within the openings of adjacent lugs and bent around portions of the body portions to secure the links to the lugs, and said links being of lengths to extend between adjacent lugs when positioned on a tire to hold the lugs in spaced relation with each other.

In testimony that I claim the foregoing as my own, I have hereto affixed my signature in the presence of two witnesses.

EDWARD J. LAHAN.

Witnesses:
O. H. BRODERICK,
R. R. HOUSE.